United States Patent
Fujiwara

(10) Patent No.: US 9,989,987 B2
(45) Date of Patent: Jun. 5, 2018

(54) DEVICE FOR DETECTING AMOUNT OF PEDAL OPERATION

(75) Inventor: Noboru Fujiwara, Toyota (JP)

(73) Assignee: Toyoda Iron Works Co., Ltd., Toyota-shi, Aichi (JP)

(*) Notice: Subject to any disclaimer, the term of this patent is extended or adjusted under 35 U.S.C. 154(b) by 900 days.

(21) Appl. No.: 14/355,019

(22) PCT Filed: Jun. 22, 2012

(86) PCT No.: PCT/JP2012/066073
§ 371 (c)(1),
(2), (4) Date: Apr. 29, 2014

(87) PCT Pub. No.: WO2013/065353
PCT Pub. Date: May 10, 2013

(65) Prior Publication Data
US 2014/0311277 A1    Oct. 23, 2014

(30) Foreign Application Priority Data
Oct. 31, 2011    (JP) .................................. 2011-238440

(51) Int. Cl.
*G05G 1/30*    (2008.04)
*B60T 7/04*    (2006.01)
*G05G 1/38*    (2008.04)

(52) U.S. Cl.
CPC ................ *G05G 1/30* (2013.01); *B60T 7/042* (2013.01); *G05G 1/38* (2013.01); *Y10T 74/20528* (2015.01)

(58) Field of Classification Search
CPC ... B60T 7/042; B60T 7/04; B60T 7/02; B60T 17/221; B60T 17/22; G05G 1/38;
(Continued)

(56) References Cited

U.S. PATENT DOCUMENTS 6,276,763 B1 *   8/2001   Isono ...................... B60T 7/042
                                                                 188/358
7,134,327 B2    11/2006   Saito et al.
(Continued)

FOREIGN PATENT DOCUMENTS

CN    1701219        11/2005
DE    2156736 A1 *   5/1973    ................ B60T 7/04
(Continued)

OTHER PUBLICATIONS

Machine translation of DE 2156736, obtained Feb. 1, 2017.*
(Continued)

*Primary Examiner* — Richard W Ridley
*Assistant Examiner* — Brian J McGovern
(74) *Attorney, Agent, or Firm* — Finnegan, Henderson, Farabow, Garrett & Dunner, LLP

(57) ABSTRACT

A pedal operation amount detection apparatus comprising: a transmitting member that transmits a pedal operation force; a movement lever disposed so as to be movable with respect to the transmitting member; a sensor rod disposed so as to be connected to the transmitting member and the movement lever; and a deformable body that is disposed on the transmitting member and is deformed when the pedal operation force or a reaction force corresponding to the pedal operation force is transmitted from the movement lever to the deformable body, the pedal operation amount detection apparatus electrically detecting a pedal operation amount based on deformation of the deformable body, the sensor rod extending through both the movement lever and the deformable body, the pedal operation amount detection apparatus further comprising: a first locking portion provided at an end portion of the sensor rod on a side where the sensor rod protrudes from the deformable body; a second locking portion provided at an intermediate portion of the sensor rod (Continued)

between the deformable body and the movement lever; a first elastic member that is disposed between the second locking portion and the deformable body in a natural state or a compressed state when a pedal is not operated; and a second elastic member that is disposed to so as to be connected to the movement lever and the sensor rod, and urges the movement lever to cause the movement lever to contact the second locking portion, when the pedal is operated, a load in a direction to displace the sensor rod toward the first locking portion is applied from the movement lever to the second locking portion, the sensor rod being moved toward the first locking portion in a manner such that the first elastic member is elastically deformed between the second locking portion and the deformable body, and the deformable body being deformed.

4 Claims, 7 Drawing Sheets

(58) Field of Classification Search
CPC . G05G 1/30; G05G 1/44; G05G 1/445; G01L 5/0038; G01L 5/0028
See application file for complete search history.

(56) References Cited

U.S. PATENT DOCUMENTS

| | | | |
|---|---|---|---|
| 9,134,748 B2 * | 9/2015 | Fujiwara | B60T 7/042 |
| 2002/0056337 A1 | 5/2002 | Sundaresan et al. | |
| 2006/0162434 A1 | 7/2006 | Saito et al. | |
| 2006/0230870 A1 * | 10/2006 | Fukase | B60T 7/06 74/512 |

FOREIGN PATENT DOCUMENTS

| | | |
|---|---|---|
| JP | 2001-18768 | 1/2001 |
| JP | 2001-334919 A | 12/2001 |
| JP | 2005-132216 | 5/2005 |

OTHER PUBLICATIONS

English Language Translation of Japanese Application No. 2001-18768 (Published Jan. 23, 2001).
Office Action for Chinese Appl. No. 201280053242.6 dated Mar. 3, 2015.
Notification of Reasons for Refusai issued in Japanese patent application No. 2011-170557 dated Jan. 21, 2014.
Office Action issued in Chinese patent application No. 201280038468.9 dated Aug. 28, 2014.
Office Action issued in Chinese patent application No. 201280038468.9 dated Apr. 22, 2015.
Office Action issued in U.S. Appl. No. 14/236,398 dated Oct. 24, 2014.
Notice of Allowance issued in U.S. Appl. No. 14/236,398 dated May 13, 2015.
Supplemental Notice of Allowance issued in U.S. Appl. No. 14/236,398 dated Jul. 23, 2015.

* cited by examiner

DEVICE FOR DETECTING AMOUNT OF PEDAL OPERATION

CROSS-REFERENCE TO RELATED APPLICATIONS

This application is a national phase application of International Application No. PCT/JP2012/066073, filed Jun. 22, 2012, and claims the priority of Japanese Application No. 2011-238440, filed Oct. 31, 2011, the content of both of which is incorporated herein by reference.

TECHNICAL FIELD

The present invention relates to a pedal operation amount detection apparatus, and more particularly to an improvement in a pedal operation amount detection apparatus including a movement lever and a sensor rod.

BACKGROUND ART

There has been known a pedal operation amount detection apparatus that includes (a) a transmitting member that transmits a pedal operation force, (b) a movement lever disposed so as to be movable with respect to the transmitting member, (c) a sensor rod disposed so as to be connected to the transmitting member and the movement lever, and (d) a deformable body that is disposed on the transmitting member and is deformed when the pedal operation force or a reaction force corresponding to the pedal operation force is transmitted from the movement lever to the deformable body, and that (e) electrically detects a pedal operation amount based on deformation of the deformable body. An apparatus described in Patent Document 1 is an example. When a pedal is operated, the movement lever is caused to contact the sensor rod, the sensor rod is moved in an axial direction in a manner such that an elastic member disposed between the sensor rod and the deformable body is elastically deformed, and the deformable body is deformed. Further, Patent Document 2 describes a technology in which a spring is disposed between a movement lever and an operating pedal (a transmitting member) and the movement lever is caused to contact a contact portion of a detector.

RELATED ART DOCUMENT

Patent Document

Patent Document 1: Japanese Patent Application Publication No. 2005-132216 (JP 2005-132216 A)
Patent Document 2: Japanese Patent Application Publication No. 2001-018768 (JP 2001-018768 A)

SUMMARY OF THE INVENTION

Problem to be Solved by the Invention

However, in the apparatus described in Patent Document 1, it is difficult to keep the movement lever in contact with the sensor rod without applying a preload to the deformable body when the pedal is not operated, and thus, there is a possibility that a backlash or play (a loss stroke) may be caused or there may be variation in the preload, and hence detection accuracy may be deteriorated. When the loss stroke is caused, there is a possibility that a depressing stroke may be increased and operability may be deteriorated. When the movement lever is urged by using the spring as in Patent Document 2, the loss stroke can be eliminated, but there is a possibility that there may he variation in the preload applied due to an urging force of the spring and detection accuracy may be deteriorated.

The present invention is made in view of the above circumstances, and it is an object of the present invention to eliminate a backlash or a loss stroke of a movement lever without applying a preload to a deformable body when a pedal is not operated, and to make it possible to detect a pedal operation amount with high accuracy from an initial stage of a pedal depressing operation.

Means for Solving the Problem

To achieve the object, a first aspect of the present invention provides a pedal operation amount detection apparatus comprising: (a) a transmitting member that transmits a pedal operation force; (b) a movement lever disposed so as to be movable with respect to the transmitting member; (c) a sensor rod disposed so as to be connected to the transmitting member and the movement lever; and (d) a deformable body that is disposed on the transmitting member and is deformed when the pedal operation force or a reaction force corresponding to the pedal operation force is transmitted from the movement lever to the deformable body, the pedal operation amount detection apparatus (e) electrically detecting a pedal operation amount based on deformation of the deformable body, characterized in that (f) the sensor rod extends through both the movement lever and the deformable body, (g) a first locking portion is provided at an end portion of the sensor rod on a side where the sensor rod protrudes from the deformable body, and a second locking portion is provided at an intermediate portion of the sensor rod between the deformable body and the movement lever, and the pedal operation amount detection apparatus comprises: (h) a first elastic member that is disposed between the second locking portion and the deformable body in a natural state or a compressed state when a pedal is not operated; and (i) a second elastic member that is disposed to so as to be connected to the movement lever and the sensor rod, and urges the movement lever to cause the movement lever to contact the second locking portion, (j) when the pedal is operated, a load in a direction to displace the sensor rod toward the first locking portion is applied from the movement lever to the second locking portion, the sensor rod is moved toward the first locking portion in a manner such that the first elastic member is elastically deformed between the second locking portion and the deformable body, and the deformable body is deformed.

A second aspect of the present invention provides the pedal operation amount detection apparatus recited in the first aspect of the present invention, wherein (a) the sensor rod includes a third locking portion provided at an end portion on a side where the sensor rod protrudes from the movement lever, and (b) the second elastic member is a compression coil spring that is disposed in a compressed state between the third locking portion and the movement lever so as to be concentric with the sensor rod.

Effects of the Invention

In the pedal operation amount detection apparatus as described above, the second elastic member is disposed to so as to be connected to the movement lever and the sensor rod, the movement lever is caused to contact the second locking portion in accordance with the urging force of the second elastic member. When the pedal is operated, a load due to the pedal operation force or the reaction force is applied from the movement lever to the second locking portion, the sensor rod is moved toward the first locking portion in the manner such that the first elastic member is elastically deformed between the second locking portion and the deformable body, the deformable body is deformed, and thereby electrically detecting the pedal operation amount based on the deformation. In this case, even when the pedal is not operated, the movement lever is caused to contact the second locking portion in accordance with the urging force of the second elastic member, and the second elastic member is disposed to so as to be connected to the sensor rod and the movement lever, therefore, the urging force of the second elastic member is received by the sensor rod itself. Thus, a backlash and a loss stroke of the movement lever are eliminated without applying a preload to the deformable body, a load is appropriately transmitted to the deformable body through the first elastic member from the initial stage of the depressing operation of an operating pedal, and the pedal operation amount can be detected with high accuracy. Further, since the movement lever is caused to contact the second locking portion in accordance with the urging force of the second elastic member, a contact state, in which the movement lever is in contact with the second locking portion, can be appropriately maintained while displacement of the movement lever relative to the sensor rod due to movement of the movement lever is allowed.

In the second aspect of the present invention, since the third locking portion is provided on the sensor rod and the compression coil spring as the second elastic member is disposed in the compressed state between the third locking portion and the movement lever so as to be concentric with the sensor rod, the structure is simple and the compact configuration can be provided, and it is possible to reliably keep the movement lever in contact with the second locking portion without causing, for example, inappropriate positional relationship between the movement lever and the second locking portion. Concentricity in this case substantially means that the sensor rod is inserted into the coil, i.e., the compression coil spring, and the geometrical concentricity in a strict sense is not necessarily required.

MODES FOR CARRYING OUT THE INVENTION

Figure 1:
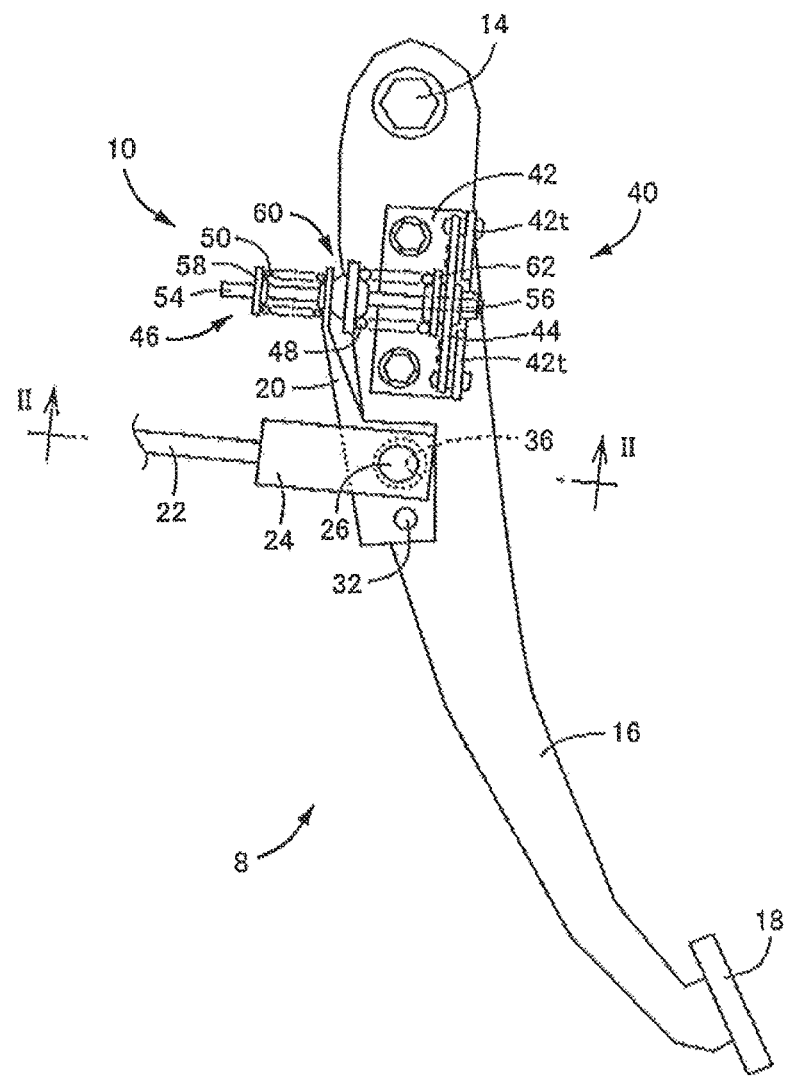
FIG. 1 is a front view showing an example of an operating pedal apparatus for a regular brake for a vehicle, in which a pedal operation amount detection apparatus according to an embodiment of the present invention is provided.

Although a pedal operation amount detection apparatus according to the present invention is suitably used as an apparatus that detects a pedal operation amount, i.e., a pedal operation force or a pedal stroke (a depressing stroke) of a vehicle operating pedal such as a brake pedal or an accelerator pedal, it can be also applied as a pedal operation amount detection apparatus for an operating pedal other than an operating pedal for a vehicle. The vehicle operating pedal may be configured so that wheel brakes and the like are mechanically operated in accordance with an operation of the operating pedal, or may be an electrical (by-wire type) operating pedal apparatus that electrically controls wheel brakes, a vehicle drive apparatus, and the like in accordance with an electrically detected pedal operation amount.

A transmitting member may be the operating pedal itself that is depressed. However, when the pedal operation force is transmitted through an intermediate lever or a coupling link, the intermediate lever or the coupling link may be used as the transmitting member. According to the present invention, for example, the configuration is such that (a) the transmitting member is disposed so as to be turnable around a support axis, and the movement lever is disposed so as to be movable around a movement axis with respect to the transmitting member, the movement axis being parallel to the support axis, and (b) an output member, to which the pedal operation force is transmitted from the transmitting member through the movement lever, and which applies a reaction force corresponding to the pedal operation force to the movement lever, is provided (this is a preferred form 1). However, the present invention can be also applied when the pedal operation force is transmitted to the transmitting member from the movement lever. The output member is a member which is coupled to the operating pedal or the intermediate lever so as to be turnable, and to which the pedal operation force is transmitted and the reaction force is applied. The output member is, for example, an operating rod of a brake booster or a push rod of a brake master cylinder, to which a brake reaction force is directly applied. The coupling link coupled to the operating pedal, the intermediate lever coupled to the coupling link, or the like may be used as the output member. In the case of a by-wire type operating pedal apparatus, the reaction force may be applied to the output member with the use of, for example, a reaction mechanism such as a spring.

A deformable body is deformed in accordance with the pedal operation force or the reaction force, and the deformable body is formed of a metal or another material that is elastically deformable, for example, a spring plate material. To electrically detect a strain (deformation) of this deformable body, a strain sensor such as a strain gauge is used. Moreover, based on a detection value from the strain sensor, a pedal operation amount such as a pedal operation force or a pedal stroke is obtained from, for example, a predetermined conversion expression or map.

A through hole, into which a sensor rod is inserted, is formed in each of the movement lever and the deformable body, and the through hole in the movement lever is formed so that a predetermined clearance is provided between the movement lever and the sensor rod, or is formed as an elongated hole to allow movement of the movement lever. Instead of the through hole, a slit that reaches a distal end of the movement lever may be provided. The through hole in the deformable body is formed to have a dimension smaller than a first locking portion of the sensor rod to prevent the first locking portion from passing through the through hole. The deformable body is formed of, for example, a flexibly deformable elongated plate material, both end portions of the elongated plate material in a longitudinal direction are fixed to the transmitting member, the through hole is formed at a central portion of the elongated plate material in the longitudinal direction, and the deformable body is configured so that the sensor rod is inserted into the through hole in a direction substantially perpendicular to the deformable body. The deformable body may be configured so that the deformable body is turned together with the sensor rod around a predetermined axis with respect to the transmitting member due to the movement of the movement lever. In this case, the clearance between the movement lever and the sensor rod can be reduced.

The movement lever is caused to make contact with a second locking portion of the sensor rod and a first elastic member is locked to the second locking portion. A portion with which the movement lever is caused to make contact, and a portion to which the first elastic member is locked may be apart from each other in the axial direction of the sensor rod. It is preferable that at least one of contact portions of the movement lever and the second locking portion should have an arc shape or a spherical shape so that a contact state can be appropriately maintained irrespective of the movement of the movement lever.

A compression coil spring or a disc spring is appropriate as the first elastic member disposed between the second locking portion and the deformable body, and it is preferable that the first elastic member should be disposed concentrically with the sensor rod. However, another spring member such as a torsion coil spring or another elastic body such as rubber may be employed. Concentricity in this case substantially means that the sensor rod is inserted into a coil or the like, and the geometrical concentricity in a strict sense is not necessarily required. With regard to a second elastic member that urges the movement lever to cause the movement lever to contact the second locking portion, a spring member such as a compression coil spring, a disc spring, or a torsion coil spring, or another elastic body such as rubber may be employed. In the second aspect of the present invention, a compression coil spring as a second elastic member is disposed between a third locking portion and the movement lever. However, when the first aspect of the present invention is implemented, for example, a tension coil spring or a torsion coil spring may be disposed between the movement lever and the second locking portion and the movement lever may be pulled so as to contact the second locking portion, and a third locking portion is not necessarily required.

In a case where the output member that applies the reaction force to the movement lever is provided as in the preferred form 1, for example, the configuration may be such that there are provided (a) an elasticity transmitting region in which, when the transmitting member is turned around the support axis in accordance with the pedal operation force, the movement lever is moved with respect to the transmitting member in a manner such that the first elastic member is elastically deformed in accordance with the reaction force, and the reaction force is transmitted to the deformable body from the movement lever through the sensor rod and the first elastic member, and (b) transmission restricting region in which, when a turning amount of the transmitting member exceeds a predetermined stopper stroke, the movement lever contacts a stopper provided in the transmitting member so that further movement of the movement lever is inhibited, and the reaction force transmitted to the sensor rod from the movement lever is kept constant.

In a case where the elasticity transmitting region and the transmission restricting region are provided as described above, in the elasticity transmitting region, the reaction force is transmitted to the deformable body while the first elastic member is elastically deformed due to the movement of the movement lever, and the deformable body is appropriately deformed in accordance with a pedal stroke so that a pedal operation amount can be detected, and on the other hand, in the transmission restricting region, the movement of the movement lever is inhibited and the reaction force transmitted from the first elastic member to the deformable body is kept constant, and therefore, excessive reaction force is prevented from acting on the deformable body and a size or a thickness of the deformable body can be reduced. However, the configuration may be such that the stopper is not provided, and thus, only the elasticity transmitting region is provided. Furthermore, the first elastic member may be elastically deformed in advance and disposed in the elastically deformed state so as to provide a direct transmitting region in which the reaction force is directly transmitted to the deformable body from the movement lever through the sensor rod and the first elastic member without elastically deforming the first elastic member until a predetermined reaction force (pedal operation force) is reached. In a case where the first elastic member is in a substantially natural state in an initial state, the first elastic member is elastically deformed from an initial stage of a pedal depressing operation, and the deformation reaches the elasticity transmitting region immediately without passing through the direct transmitting region.

Further, (a) the output member is coupled to the movement lever through a coupling pin parallel to the movement axis, (b) a collar is disposed on the movement lever and the coupling pin is inserted into the collar, and (c) a stopper hole that is the stopper is formed in the transmitting member, the collar is inserted into the stopper hole in a manner such that a predetermined clearance is provided around the movement axis between the collar and the transmitting member, the clearance allows the movement lever to move, and when the turning amount reaches the stopper stroke, the collar contacts an inner wall surface defining the stopper hole to inhibit the further movement of the movement lever.

In this case, by causing the collar disposed on the movement lever to contact the inner wall surface defining the stopper hole, the stopper stroke is set to inhibit the further movement of the movement lever. Therefore, variation in the stopper stroke is determined by only two factors, that is, an outer diameter dimension of the collar and an inner diameter dimension of the stopper hole, and thus, the stopper stroke can be managed with high accuracy. On the other hand, the coupling pin that couples the movement lever to the output member is inserted into the collar, and hence the structure is simple and the inexpensive configuration is provided. However, various forms may be employed. For example, the coupling pin that couples the output member to the movement lever may directly contact the inner wall surface defining the stopper hole, or a stopper that restricts a movement range of the movement lever may be provided in the transmitting member, separately from the collar and the coupling pin.

In a case where the pedal operation force is transmitted to the movement lever from a predetermined input member, for example, the configuration may be such that there are provided (a) an elasticity transmitting region in which, when the transmitting member is turned around the support axis in accordance with the pedal operation force, the movement lever is moved with respect to the transmitting member in a manner such that the first elastic member is elastically deformed in accordance with the pedal operation force, and the pedal operation force is transmitted to the deformable body through the sensor rod and the first elastic member, and (b) a transmission restricting region in which, when a turning amount of the transmitting member exceeds a predetermined stopper stroke, the movement lever contacts the stopper provided in the transmitting member so that the further movement of the movement lever is inhibited, and the pedal operation force transmitted from the movement lever to the deformable body is kept constant. Furthermore, (a) the input member is coupled to the movement lever through a coupling pin parallel to the movement axis, (b) a collar is disposed on the movement lever and the coupling pin is inserted into the collar, and (c) a stopper hole that is the stopper is formed in the transmitting member, the collar is inserted into the stopper hole in a manner such that a predetermined clearance is provided around the movement axis between the collar and the transmitting member, the clearance allows the movement lever to move, and when the turning amount reaches the stopper stroke, the collar contacts an inner wall surface defining the stopper hole so that the further movement of the movement lever is inhibited.

Embodiment

An embodiment according to the present invention will now be described hereinafter in detail with reference to the drawings.

Figure 2:
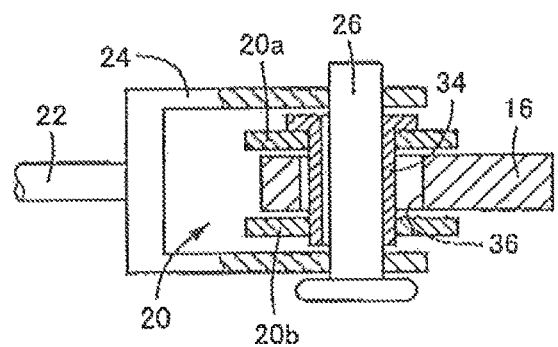
FIG. 2 is a sectional view showing an enlarged portion taken along a line II-II in FIG. 1 and seen in a direction indicated by arrows in FIG. 1.
Figure 3:
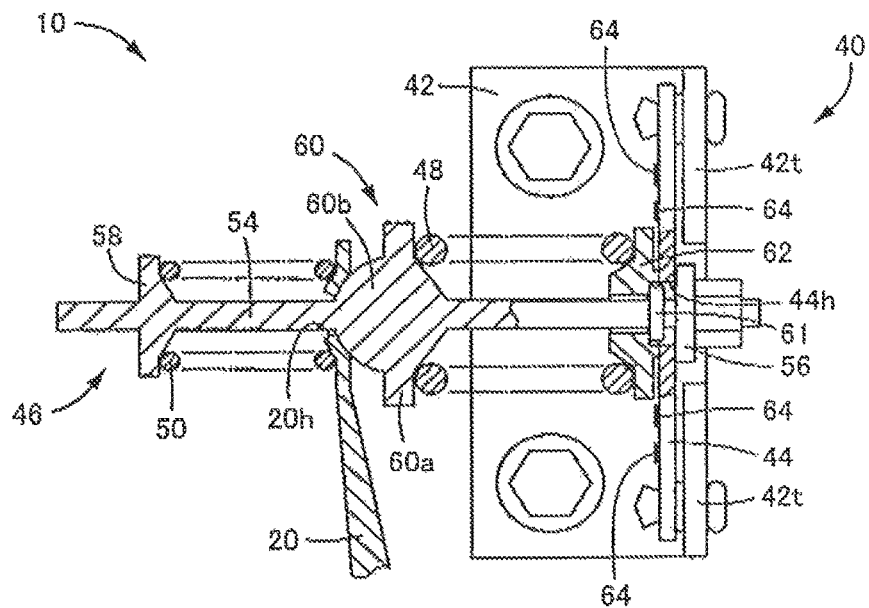
FIG. 3 is a partially cutaway front view showing the pedal operation amount detection apparatus in the embodiment of FIG. 1 in a manner such that a main portion of the pedal operation amount detection apparatus is partially cut away and enlarged.

FIG. 1 is a front view showing an operating pedal apparatus 8 for a regular brake for a vehicle, in which a pedal operation amount detection apparatus 10 according to an embodiment of the present invention is provided (a view showing the operating pedal apparatus 8 seen from a left side of the vehicle when the operating pedal apparatus 8 is disposed in the vehicle). FIG. 2 is a sectional view showing an enlarged portion taken along a line II-II in FIG. 1 and seen in a direction indicated by arrows in FIG. 1. FIG. 3 is a partially cutaway front view showing the pedal operation amount detection apparatus 10 in FIG. 1 in a manner such that a main portion of the pedal operation amount detection apparatus 10 is partially cut away and enlarged. The operating pedal apparatus 8 includes an operating pedal 16 disposed to turn around an axis of a support shaft 14 that is substantially parallel to a pedal support (not shown). The axis of the support shaft 14 corresponds to a support axis and a first pivot axis. The operating pedal 16 is depressed by a driver in accordance with a braking request. A tread portion (a pad) 18 as a pedal-operation-force applied portion is provided at a lower end portion of the operating pedal 16, and an operating rod 22 of a brake booster is coupled to an intermediate portion of the operating pedal 16 through a movement lever 20. The operating pedal 16 is an input member in which a pedal operation force N is applied to the tread portion 18, and corresponds to a transmitting member that transmits the pedal operation force N toward the operating rod 22. The operating rod 22 corresponds to an output member to which the pedal operation for N is transmitted from the operating pedal 16 through the movement lever 20 and to which a brake reaction force R corresponding to the pedal operation force N is applied by the brake booster. In the case of a by-wire type operating pedal apparatus that electrically controls wheel brakes, a reaction force member, to which a predetermined reaction force is applied by a reaction force mechanism or the like, is coupled, instead of the operating rod 22.

The movement lever 20 is disposed so as to be movable around an axis of a support pin 32 with respect to the operating pedal 16, the axis of the support pin 32 being parallel to the support shaft 14. That is, the movement lever 20 is connected to the support pin 32 that corresponds to a connecting portion of the operating pedal 16 (i.e., transmitting member) which is located between the axis of the support shaft 14 (i.e., first pivot axis) and the tread portion 18 (i.e., pedal-operation-force applied portion) in a longitudinal direction of the operating pedal 16 (i.e., transmitting member). The movement lever 20 upwardly extends along the operating pedal 16 and includes paired side plate portions 20a, 20b disposed to be parallel to both sides of the operating pedal 16 as shown in FIG. 2. A cylindrical collar 34 is disposed to extend through the side plate portions 20a, 20b and to be parallel to the support pin 32. A circular stopper hole 36, into which the collar 34 is inserted with a predetermined clearance between the collar 34 and the operating pedal 16, is formed in the operating pedal 16, the clearance allows the movement lever 20 to move, and a movement range is defined when the collar 34 is caused to contact an inner wall surface defining the stopper hole 36. The axis of the support pin 32 corresponds to a movement axis of the movement lever 20 (i.e., a second pivot axis), and the stopper hole 36 functions as a stopper that restricts the movement of the movement lever 20 with respect to the operating pedal 16.

Figure 5:
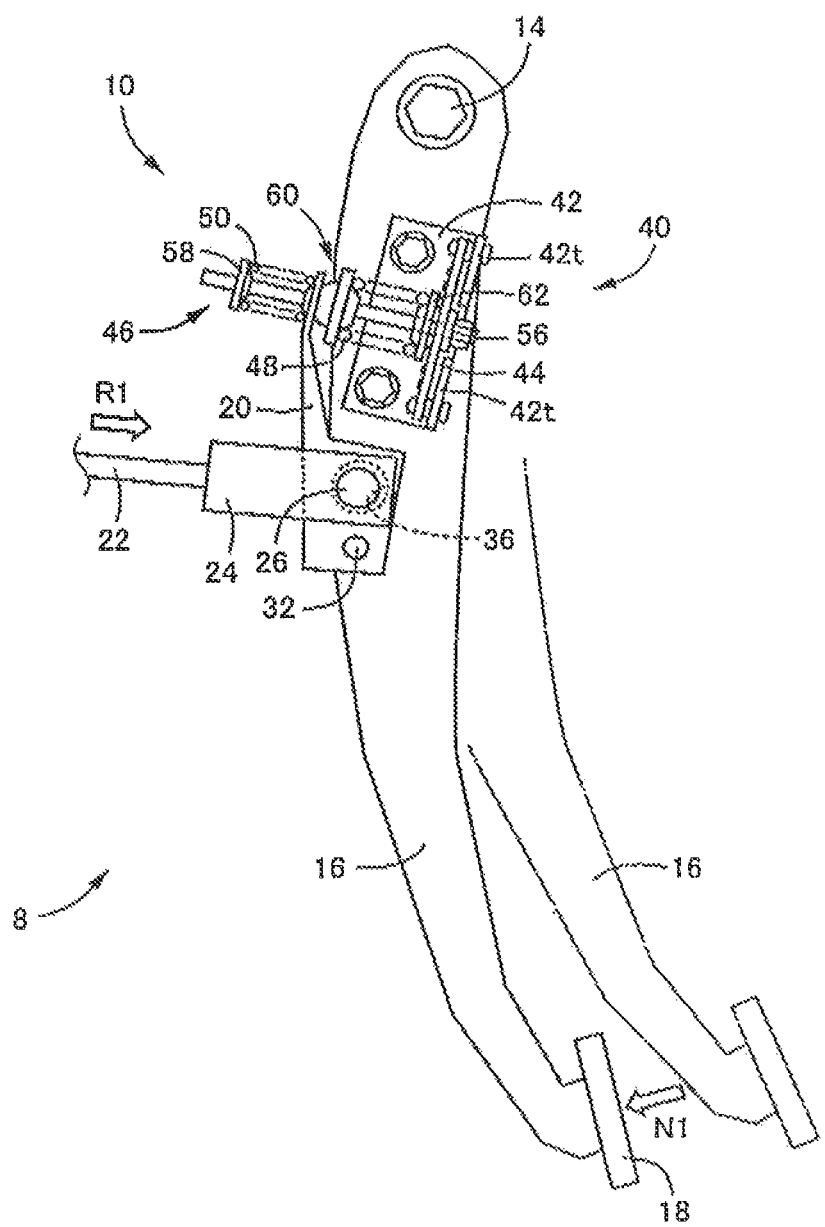
FIG. 5 is a front view showing a state in which the operating pedal is depressed with a predetermined pedal operation force N1 in the embodiment of FIG. 1.
Figure 6:
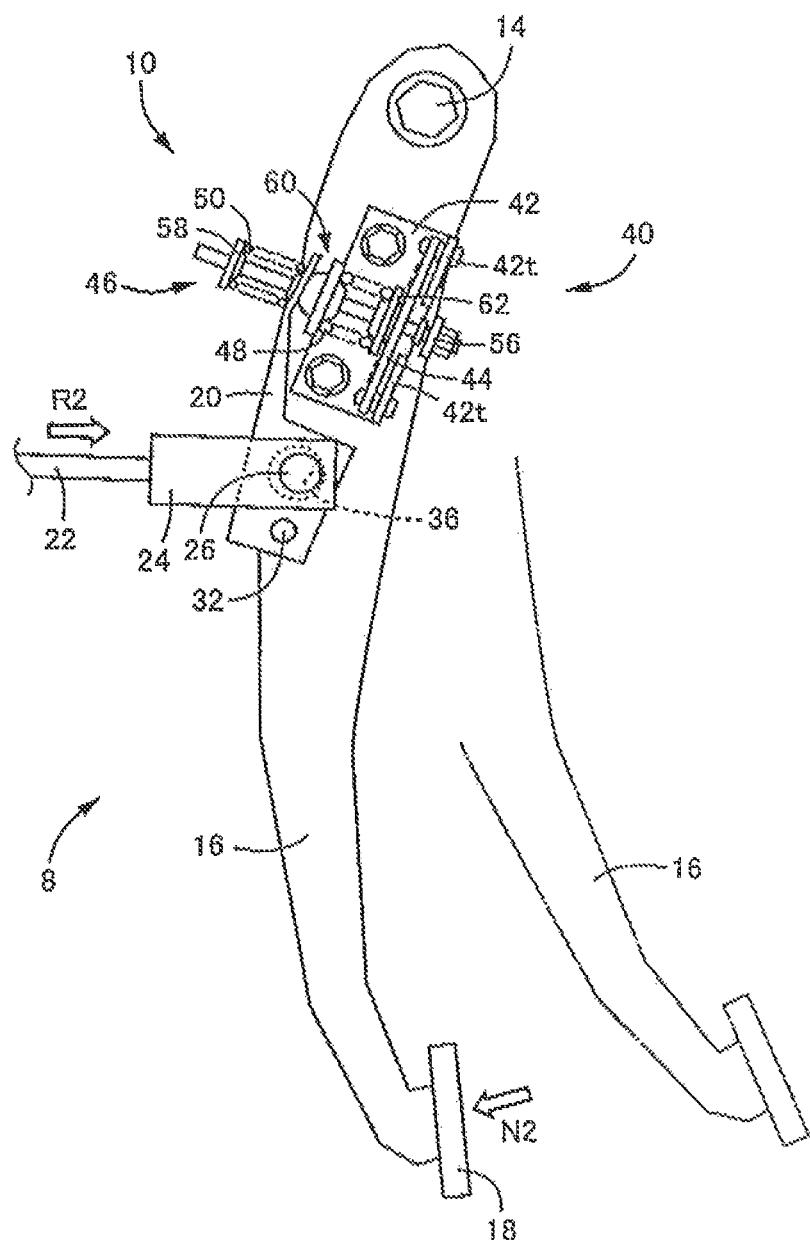
FIG. 6 is as front view showing a state in which the operating pedal is depressed with a pedal operation force N2 higher than N1 in the embodiment of FIG. 1.

A bifurcated (U-shaped) clevis 24 is fixedly fitted to an end portion of the operating rod 22 through screw coupling or the like, and a columnar clevis pin 26 having a circular cross section is disposed to be parallel to the support pin 32. When the clevis pin 26 is inserted into the collar 34 so that the clevis pin 26 is rotatable relative to the collar 34, the operating rod 22 is coupled to the movement lever 20 so that the operating rod 22 is turnable relative to the movement lever 20. When the operating pedal 16 is depressed as shown in FIG. 5 and FIG. 6, a force that moves the movement lever 20 in a clockwise direction around the support pin 32 is applied from the operating rod 22 to the movement lever 20 in accordance with brake reaction forces R1, R2. The collar 34 is fixedly fitted to the pair of side plate portions 20a, 20b of the movement lever 20, for example. The clevis pin 26 corresponds to a coupling pin. The operating pedal 16 indicated by an alternate long and short dash line in each of FIG. 5 and FIG. 6 represents an initial position when the pedal is not operated.

The operating rod 22 is coupled to a proximal end side portion of the movement lever 20 that upwardly extends along the operating pedal 16, i.e., a portion near the support pin 32, and a distal end of the movement lever 20 is coupled to the operating pedal 16 through a load detection unit 40. The pedal operation amount detection apparatus 10 is configured to include the movement lever 20 and the load detection unit 40, and the load detection unit 40 includes a deformable body 44 that is fixedly fitted to the operating pedal 16 through a bracket 42, a sensor rod 46 that extends through both the deformable body 44 and the movement lever 20, and a pair of a first compression coil spring 48 and a second compression coil spring 50 disposed to be substantially concentric with the sensor rod 46, as apparent from FIG. 3. Concentricity in this case substantially means that the sensor rod 46 is inserted into the coils, i.e., the first compression coil spring 48 and the second compression coil spring 50, and the geometrical concentricity in a strict sense is not necessarily required. Through holes 44h, 20h, into which the sensor rod 46 is inserted to be movable in the axial direction, are formed in the deformable body 44 and the movement lever 20, respectively. The first compression coil spring 48 corresponds to a first elastic member, and the second compression coil spring 50 corresponds to a second elastic member.

Figure 4:
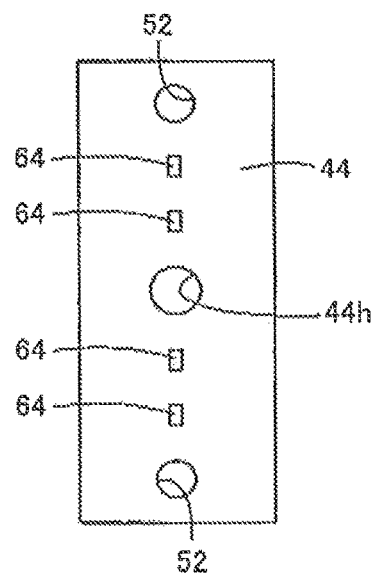
FIG. 4 is a view of strain sensors disposed in the deformable body of the pedal operation amount detection apparatus of FIG. 3.

The deformable body 44 is formed of a rectangular plate material as shown in FIG. 4, and is formed of a spring plate material or the like that is flexibly deformable. Both end portions (both upper and lower end portions) of the deformable body 44 in a longitudinal direction thereof are fixedly fitted to the bracket 42 by rivets or the like in a posture in which the longitudinal direction of the deformable body 44 is an up-down direction, i.e., a direction substantially perpendicular to a turning direction of the operating pedal 16, and the deformable body 44 is substantially perpendicular to a plane on which the operating pedal 16 is turned (perpendicular to a plane of paper of FIG. 1). Paired fitting holes 52, which are used to fix to the brackets 42 by using the rivets or the like, are formed in the respective end portions of the deformable body 44 in the longitudinal direction. Paired vertical wall portions 42t that are bent at substantially right angles are provided in the bracket 42, and the deformable body 44 is fixed to the vertical wall portions 42t. Further, the through hole 44h is formed at the center of the deformable body 44 in the longitudinal direction, and the sensor rod 46 extends through the through hole 44h in a posture in which the sensor rod 46 is substantially perpendicular to a plate surface of the deformable body 44, in other words, a posture in which the sensor rod 46 is substantially parallel to the operating rod 22.

The sensor rod 46 includes a columnar elongated shaft portion 54, a first retaining portion 56 provided at an end portion of the shaft portion 54 on a side where the shaft portion 54 protrudes from the through hole 44h of the deformable body 44, a second retaining portion 58 provided at an end portion of the shaft portion 54 on a side where the shaft portion 54 protrudes from the through hole 20h of the movement lever 20, and an intermediate locking portion 60 provided at an intermediate portion located between the deformable body 44 and the movement lever 20. Each of the first retaining portion 56, the second retaining portion 58, and the intermediate locking portion 60 is configured separately from the shaft portion 54 as appropriate, and is fixedly fitted to the shaft portion 54 by fixing means such as a screw, an adhesive, or welding. Their fitting positions may be appropriately changed. FIG. 3 shows a section in which the second retaining portion 58 and the intermediate locking portion 60 are integrated with the shaft portion 54, for the convenience's sake.

The intermediate locking portion 60 includes a spring receiving flange 60a on which one end portion of the first compression coil spring 48 is seated, and the other end portion of the first compression coil spring 48 is seated on a spring receiving member 62 disposed to be movable in the axial direction of the shaft portion 54. The spring receiving member 62 is disposed to contact a stopper 61 integrally provided in the shaft portion 54 and held substantially in contact with the deformable body 44 in an initial state. A surface of the deformable body 44 on the opposite side is substantially in contact with the first retaining portion 56, and the sensor rod 46 is disposed so that the deformable body 44 is sandwiched and positioned between the spring receiving member 62 and the first retaining portion 56. The first compression coil spring 48 is disposed in a predetermined compressed state. The first retaining portion 56 corresponds to a first locking portion, and the intermediate locking portion 60 corresponds to a second locking portion.

The intermediate locking portion 60 also includes a partially spherical (hemispherical in the embodiment) contact portion 60b protruding toward the second retaining portion 58, and the movement lever 20 is caused to contact the contact portion 60b in accordance with the brake reaction force R when the pedal is operated, that is, when the operating pedal 16 is depressed. That is, the movement lever 20 is pivoted relative to the operating pedal 16 (i.e., transmitting member) in a load applying direction (i.e., clockwise direction as seen in FIG. 1) about the axis of the support pin 32 (i,e., second pivot axis) which is parallel to axis of the support shaft 14 (i.e., first pivot axis) and which corresponds to the above-described connecting portion of the operating pedal 16, when the brake reaction force R is applied to a reaction-force applied portion of the movement lever 20 which corresponds to the above-described cylindrical collar 34 and which is distant from the axis of the support pin 32 (i.e., second pivot axis) in a longitudinal direction of the movement lever 20. The second compression coil spring 50 is disposed in a compressed state between the second retaining portion 58 and the movement lever 20 so as to be substantially concentric with the sensor rod 46, and the movement lever 20 is held in a contact state in which the movement lever 20 is in contact with the contact portion 60b in accordance with an urging force of the second compression coil spring 50 even when the pedal is not operated. The movement lever 20 is held at its contact portion in contact with the intermediate locking portion 60 (i.e., second locking portion) of the sensor rod 46, wherein the contact portion of the movement lever 20 is located on one of opposite sides of the above-described reaction-force applied portion in the longitudinal direction of the movement lever 20, which is remote from the axis of a support pin 32 as the second pivot axis in the longitudinal direction of the movement lever 20. The through hole 20h in the movement lever 20 is formed so that a predetermined clearance is provided between the shaft portion 54 of the sensor rod 46 and the movement lever 20 to allow relative displacement of the sensor rod 46 and the movement lever 20 due to the movement of the movement lever 20 when the pedal is operated. Thus, even when the pedal is operated, the sensor rod 46 is held in a posture in which the sensor rod 46 is substantially perpendicular to the deformable body 44. Furthermore, since the contact portion 60b has a partially spherical shape, a contact state, in which the contact portion 60*b* is in contact with the movement lever 20, is appropriately maintained irrespective of the relative displacement due to the movement of the movement lever 20. A recessed portion that receives the contact portion 60*b* is provided on a part of the movement lever 20, which is caused to contact the contact portion 60*b*. The second retaining portion 58 corresponds to a third locking portion.

Figure 7:
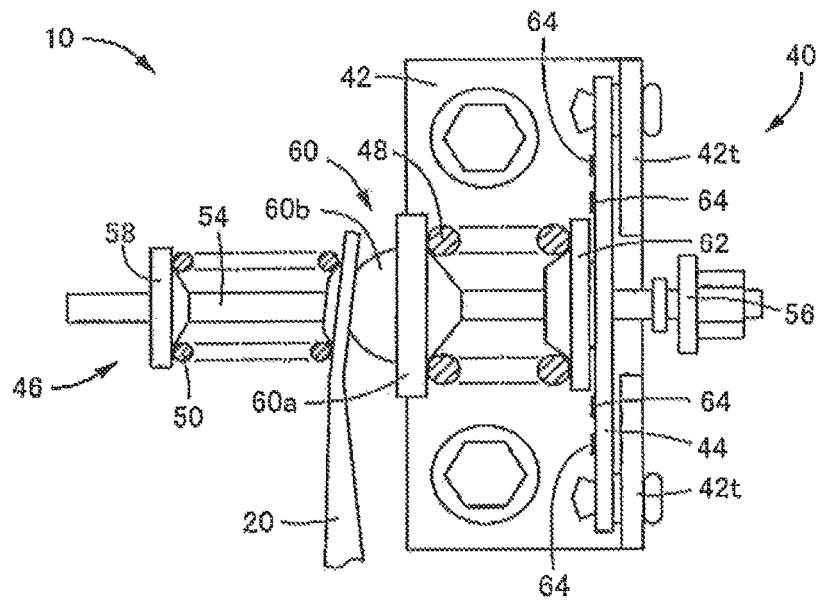
FIG. 7 is a front view of an enlarged main portion of the pedal operation amount detection apparatus when the depressing operation is performed as depicted in FIG. 6.

Moreover, in the operating pedal apparatus 8, the operating pedal 16 is turned in the clockwise direction around the support shaft 14 in accordance with the pedal operation force N as shown in FIG. 5 and FIG. 6, and the brake reaction force R corresponding to the pedal operation force N is applied to the movement lever 20 from the operating rod 22 through the clevis pin 26 and the collar 34. In this case, in the initial state (when the pedal is not operated) shown in FIG. 1 in this embodiment, since the first compression coil spring 48 is interposed in a predetermined compressed state between the intermediate locking portion 60 of the sensor rod 46 and the spring receiving member 62, the first compression coil spring 48 is not elastically deformed until the predetermined brake reaction force R is reached. FIG. 5 showing that a pedal operation force N1 is applied corresponds to a state in which the brake reaction force R1 is directly transmitted from the movement lever 20 to the deformable body 44 through the sensor rod 46, the first compression coil spring 48 and the spring receiving member 62 without elastically deforming the first compression coil spring 48. FIG. 6 showing that a pedal operation force N2 higher than N1 is applied corresponds to a case in which the first compression coil spring 48 is elastically deformed (compressively deformed) in accordance with the brake reaction force R2. A load in a direction to displace the sensor rod 46 toward the first retaining portion 56 is applied to the intermediate locking portion 60 from the movement lever 20, the sensor rod 46 is moved toward the first retaining portion 56 in a manner such that the first compression coil spring 48 is elastically deformed between the intermediate locking portion 60 and the deformable body 44, and the deformable body 44 is deformed. FIG. 7 is a front view of the pedal operation amount detection apparatus 10 in a state in which the first compression coil spring 48 is elastically deformed by the brake reaction force R2 in the above-described manner. The sensor rod 46 is relatively displaced toward the first retaining portion 56 with respect to the deformable body 44, and the first retaining portion 56 is away from the deformable body 44.

Figure 8:
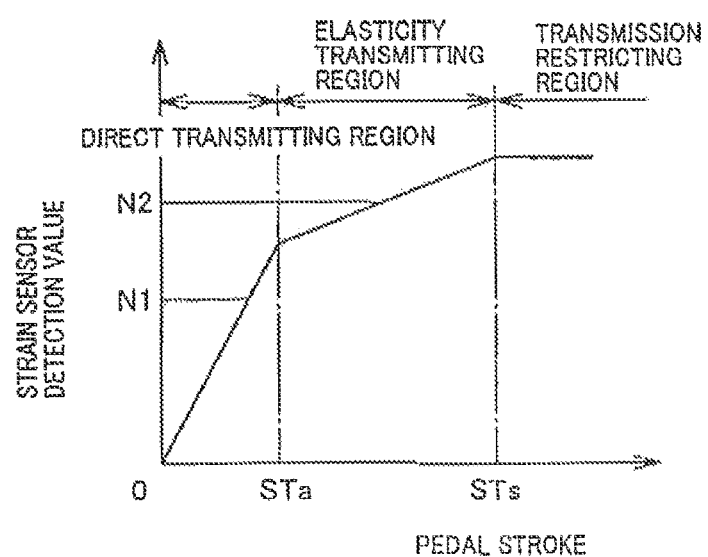
FIG. 8 is a view schematically showing detection characteristics of the strain sensors of the pedal operation amount detection apparatus of FIG. 1 in relation to a pedal stroke.

A plurality of strain sensors 64 such as strain gauges are disposed on the deformable body 44 so as to form, for example, a bridge circuit as shown in FIG. 4, and a detection signal corresponding to a deformation amount of the deformable body 44 is output. FIG. 4 shows a case in which the total of four strain sensors 64 are disposed on a straight line along the longitudinal direction of the deformable body 44 at positions symmetrical with respect to the through hole 44*h*. Since a detection value of the strain sensors 64 varies in accordance with a pedal stroke (a depressing operation amount) of the operating pedal 16, a pedal operation amount such as the pedal operation force N or the pedal stroke is obtained based on the detection value by using a predetermined conversion expression or map. FIG. 8 is a schematic view schematically showing detection characteristics of the strain sensors 64 in relation to the pedal stroke. A pedal stroke STa is an elasticity start stroke at which the first compression coil spring 48 starts to be elastically deformed due to an increase in the brake reaction force R caused by the depressing operation of the operating pedal 16. A direct transmitting region, in which the brake reaction force R is directly transmitted to the deformable body 44 from the movement lever 20 through the sensor rod 46 or the first compression coil spring 48 as shown in FIG. 5, is provided before the elasticity start stroke STa. An elasticity transmitting region, in which the first compression coil spring 48 is elastically deformed in accordance with the brake reaction force R as shown in FIG. 6, is provided beyond the elasticity start stroke STa. An increase in the detection value of the strain sensors 64, in other words, an increase in the pedal operation force N with respect to the pedal stroke becomes gradual due to an elastic deformation amount.

On the other hand, when the collar 34 of the movement lever 20 that is moved due to an increase in the brake reaction force R is caused to contact the inner wall surface defining the stopper hole 36 formed in the operating pedal 16, the further movement of the movement lever 20 is inhibited, and the brake reaction force R transmitted from the movement lever 20 to the deformable body 44 through the sensor rod 46 and the first compression coil spring 48 is prevented from further increasing. That is, when the pedal stroke of the operating pedal 16 exceeds a stopper stroke STs at which the collar 34 is caused to contact the stopper hole 36, the movement of the movement lever 20 with respect to the operating pedal 16 is inhibited even through the brake reaction force R is increased due to a further depressing operation of the operating pedal 16. Therefore, the brake reaction force R applied to the deformable body 44 from the movement lever 20 through the sensor rod 46 and the first compression coil spring 48 is kept constant, and excessive deformation of the deformable body 44 is prevented. A pedal stroke region beyond the stopper stroke STs is a transmission restricting region in which the brake reaction force R transmitted from the movement lever 20 to the deformable body 44 is kept constant. The first compression coil spring 48 is disposed in such a manner that the turning amount reaches the stopper stroke STs when a large depressing force of, for example, approximately 200 N or more is applied to the tread portion 18 of the operating pedal 16.

As described above, in the pedal operation amount detection apparatus 10 according to this embodiment, the second compression coil spring 50 is disposed between the second retaining portion 58 of the sensor rod 46 and the movement lever 20, the movement lever 20 is caused to contact the intermediate locking portion 60 in accordance with the urging force of the second compression coil spring 50. Even when the pedal is not operated, the movement lever 20 is caused to contact the intermediate locking portion 60 in accordance with the urging force of the second compression coil spring 50. That is, the second compression coil spring 50 (i.e., second elastic member) is disposed in the compressed state on one of opposite sides of the above-described contact portion of the movement lever 20, which is remote from the intermediate locking portion 60 (i.e., second locking portion) of the sensor rod 46, and urges the contact portion of the movement lever 20 in a direction substantially same as the direction in which the load is to be applied to the intermediate locking portion 60 of the sensor rod 46 from the movement lever 20 when the pedal is operated. In this case, since the second compression coil spring 50 is disposed between the second retaining portion 58 of the sensor rod 46 and the movement lever 20 and the movement lever 20 is caused to contact the intermediate locking portion 60 of the sensor rod 46, the urging force of the second compression coil spring 50 is received by the sensor rod 46 itself. Thus, a backlash and a loss stroke of the movement lever 20 are eliminated without applying a preload to the deformable body 44, a load is appropriately transmitted to the deformable body 44 through the first compression coil spring 48 from the initial stage of the depressing operation of the operating pedal 16, and the pedal operation amount can be detected with high accuracy. Further, since the movement lever 20 is caused to contact the intermediate locking portion 60 in accordance with the urging force of the second compression coil spring 50, the contact state, in which the movement lever 20 is in contact with the intermediate locking portion 60, can be appropriately maintained while the displacement of the movement lever 20 relative to the sensor rod 46 due to the movement of the movement lever 20 is allowed.

Further, in this embodiment, since the second retaining portion 58 is provided on the sensor rod 46 and the second compression coil spring 50 as the second elastic member is disposed in the compressed state between the second retaining portion 58 and the movement lever 20 so as to be substantially concentric with the sensor rod 46, the structure is simple and the compact configuration can be provided, and it is possible to reliably keep the movement lever 20 in contact with the intermediate locking portion 60 without causing, for example, inappropriate positional relationship between the movement lever 20 and the intermediate locking portion 60.

Furthermore, in this embodiment, the transmission restricting region is provided by restricting the movement range of the movement lever 20 with the use of the stopper hole 36. Thus, in the transmitting region, the brake reaction force R is transmitted from the movement lever 20 to the deformable body 44 through the sensor rod 46 and the first compression coil spring 48, and the deformable body 44 is appropriately deformed in accordance with the pedal stroke so that the pedal operation amount can be detected, and on the other hand, in the transmission restricting region, the movement of the movement lever 20 is inhibited so that the brake reaction force R transmitted to the deformable body 44 is kept constant, and hence the excessive brake reaction force R is prevented from acting on the deformable body 44, and thus a size or a thickness of the deformable body 44 can be reduced.

Moreover, in this embodiment, by causing the collar 34 disposed on the movement lever 20 to contact the inner wall surface defining the stopper hole 36, the stopper stroke STs is set to inhibit the further movement of the movement lever 20. Therefore, variation in the stopper stroke STs is determined by only two factors, that is, an outer diameter dimension of the collar 34 and an inner diameter dimension of the stopper hole 36, and thus, the stopper stroke STs can be managed with high accuracy. On the other hand, the clevis pin 26 that couples the movement lever 20 to the operating rod 72 is inserted into the collar 34, and hence the structure is simple and the inexpensive configuration is provided.

In this embodiment, the deformable body 44 is formed of a flexibly deformable elongated plate material, both end portions of the elongated plate material in the longitudinal direction are fixed to the operating pedal 16, and the sensor rod 46 is held at the central portion in the longitudinal direction in a posture in which the sensor rod 46 is substantially perpendicular to a plate surface of the deformable body 44. Therefore, with the simple and inexpensive configuration, it is possible to appropriately flexibly deform the deformable body 44 with the use of the first compression coil spring 48 disposed substantially concentrically with the sensor rod 46, thereby highly accurately detecting the pedal operation amount.

Figure 9:
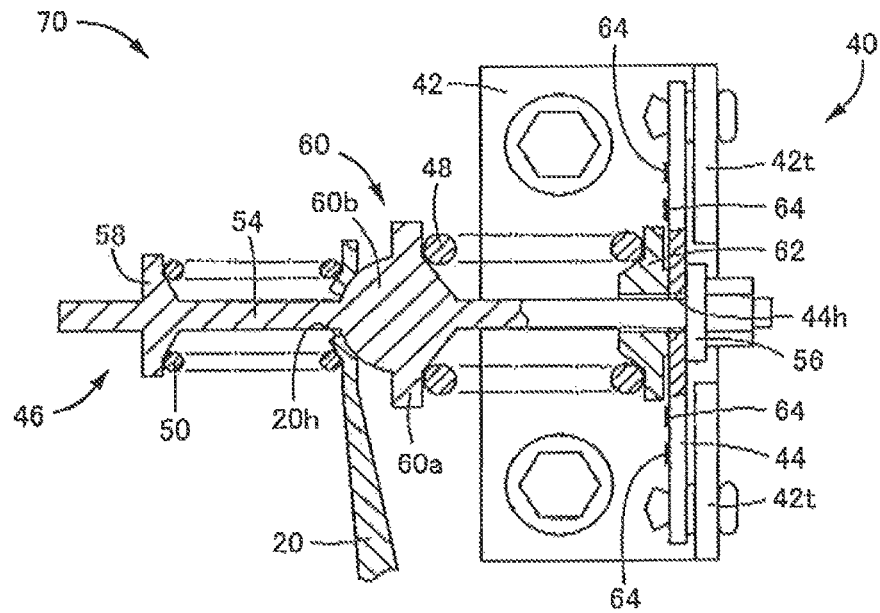
FIG. 9 is a view for explaining another embodiment in which a first compression coil spring is disposed in a substantially natural state and the view is a front view corresponding to FIG. 3.
Figure 10:
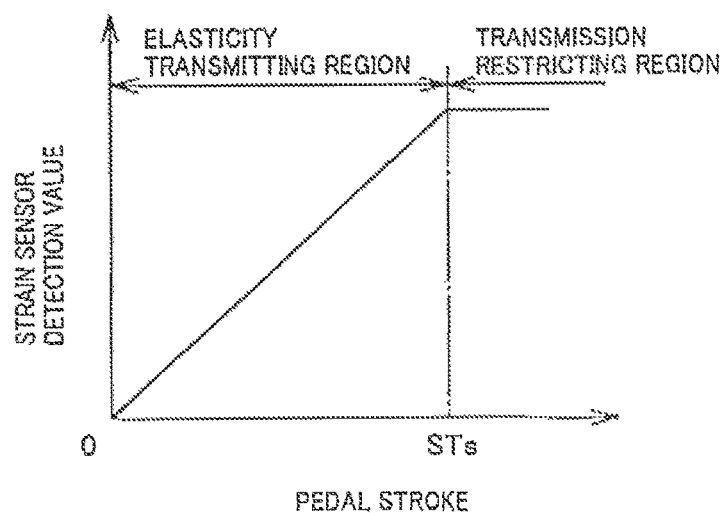
FIG. 10 is a view schematically showing detection characteristics of strain sensors of a pedal operation amount detection apparatus in the embodiment of FIG. 9 in relation to the pedal stroke.

In the foregoing embodiment, the first compression coil spring 48 is disposed in the compressed state between the intermediate locking portion 60 and the deformable body 44 in the initial state when the pedal is not operated. However, the first compression coil spring 48 may be disposed in a substantially natural state in the initial state. A pedal operation amount detection apparatus 70 in FIG. 9 is an example thereof, and the sensor rod 46 does not include the stopper 61, and the spring receiving member 62 is held between the first compression coil spring 48 and the deformable body 44 so as to be exactly in contact with the first compression coil spring 48 and the deformable body 44 in the initial state. In this case, when the brake reaction force R is applied to the movement lever 20 due to the depressing operation of the operating pedal 16, the first compression coil spring 48 starts to be compressed and deformed immediately in accordance with the brake reaction force R. Therefore, the direct transmitting region is eliminated, and the detection value increases with substantially fixed characteristics until the turning amount reaches the stopper stroke STs as shown in FIG. 10.

Figure 11:
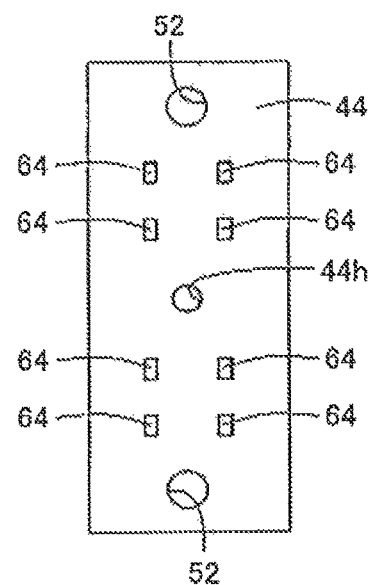
FIG. 11 is a view showing another mode of the strain sensors disposed on the deformable body of the pedal operation amount detection apparatus.
Figure 12:
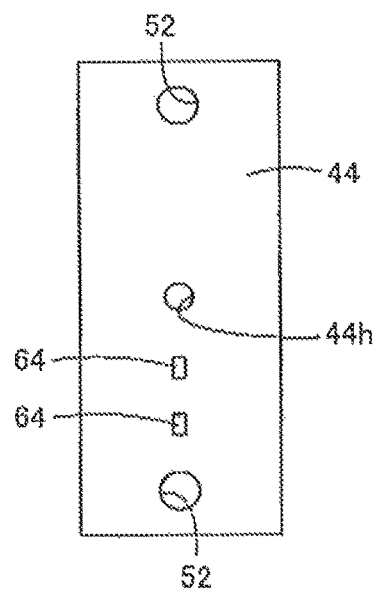
FIG. 12 is a view showing further mode of the strain sensors disposed on the deformable body of the pedal operation amount detection apparatus.

Further, in the foregoing embodiment, the four strain sensors 64 are disposed on a straight line along the longitudinal direction of the deformable body 44 as exemplified in FIG. 4. However, various forms may be employed. For example, a total of eight strain sensors 64 may be provided in parallel as shown in FIG. 11 or only a pair of strain sensors 64 may be provided in a half region in the longitudinal direction as shown in FIG. 12. The strain sensors 64 may be provided on both sides of the deformable body 44 (both right and left surfaces in FIG. 3).

Although the embodiment of the present invention has been described in detail based on the drawings, the embodiment is an example embodiment, and the present invention may be implemented in forms obtained by making various modifications and improvements to the embodiment based on knowledge of persons skilled in the art.

NOMENCLATURE OF ELEMENTS

8: operating pedal apparatus 10, 70: pedal operation amount detection apparatus 16: operating pedal (transmitting member) 20: movement lever 44: deformable body 46: sensor rod 48: first compression coil spring (first elastic member) 50: second compression coil spring (second elastic member) 56: first retaining portion (first locking portion) 58: second retaining portion (third locking portion) 60: intermediate locking portion (second locking portion) N1, N2: pedal operation force R1, R2: brake reaction force (reaction force)

The invention claimed is:

1. A pedal operation amount detection apparatus comprising:
    a transmitting member that transmits a pedal operation force;
    a movement lever disposed so as to be movable with respect to the transmitting member;
    a sensor rod disposed so as to be connected to the transmitting member and the movement lever;
    a deformable body that is disposed on the transmitting member and is deformed when the pedal operation force or a reaction force corresponding to the pedal operation force is transmitted from the movement lever to the deformable body,
    the pedal operation amount detection apparatus electrically detecting a pedal operation amount based on deformation of the deformable body, the sensor rod extending through both the movement lever and the deformable body, the sensor rod including a first locking portion provided in an end portion of the sensor rod on a side where the sensor rod protrudes from the deformable body, the sensor rod including a second locking portion provided in an intermediate portion of the sensor rod between the deformable body and the movement lever;

a first elastic member that is disposed between the second locking portion and the deformable body in a natural state or a compressed state when a pedal is not operated; and a second elastic member that is disposed between the movement lever and the sensor rod, and urges the movement lever to cause the movement lever to contact the second locking portion, when the pedal is operated, a load in a direction to displace the sensor rod toward the first locking portion is applied from the movement lever to the second locking portion, the sensor rod is being moved toward the first locking portion in a manner such that the first elastic member is elastically deformed between the second locking portion and the deformable body, and the deformable body is being deformed, the second elastic member being disposed between the movement lever and the sensor rod in a compressed state, and urging the movement lever in a same direction substantially same as the direction in which the load is to be applied to the second locking portion of the sensor rod from the movement lever when the pedal is operated.

2. The pedal operation amount detection apparatus according to claim 1, wherein the sensor rod includes a third locking portion provided in an end portion on a side where the sensor rod protrudes from the movement lever, and the second elastic member is disposed in the compressed state between the third locking portion and the movement lever so as to be concentric with the sensor rod.

3. The pedal operation amount detection apparatus according to claim 1, wherein the transmitting member is to be pivoted about a first pivot axis when the pedal is operated with the pedal operation force being applied to a pedal-operation-force applied portion of the transmitting member, the movement lever is connected to a connecting portion of the transmitting member which is located between the first pivot axis and the pedal-operation-force applied portion of the transmitting member in a longitudinal direction of the transmitting member, the movement lever is to be pivoted relative to the transmitting member in a load applying direction about a second pivot axis which is parallel to the first pivot axis and which corresponds to the connecting portion of the transmitting member, when the reaction force is applied to a reaction-force applied portion of the movement lever which is distant from the second pivot axis in a longitudinal direction of the movement lever, the movement lever includes a contact portion which is held in contact with the second locking portion of the sensor rod, the contact portion being located on one of opposite sides of the reaction-force applied portion in the longitudinal direction of the movement lever, the one of the opposite sides of the reaction-force applied portion being remote from the second pivot axis in the longitudinal direction of the movement lever, the contact portion of the movement lever is configured, when the movement lever is pivoted relative to the transmitting member in the load applying direction about the second pivot axis, to apply to the sensor rod the load acting in the direction to displace the sensor rod toward the first locking portion, and the second elastic member is disposed in the compressed state on one of opposite sides of the contact portion of the movement lever, which is remote from the second locking portion, and urges the contact portion of the movement lever in the same direction substantially same as the direction in which the load is to be applied to the second locking portion of the sensor rod from the movement lever when the pedal is operated.

4. The pedal operation amount detection apparatus according to claim 1, wherein the sensor rod includes a third locking portion provided in an end portion on a side where the sensor rod protrudes from the movement lever, and the second elastic member is disposed in the compressed state between the third locking portion and the movement lever, and urges the second locking portion of the sensor rod via the movement lever in said same direction and also urges the third locking portion of the sensor rod in a direction opposite to said same direction.

* * * * *